(12) United States Patent
He et al.

(10) Patent No.: US 9,257,744 B2
(45) Date of Patent: Feb. 9, 2016

(54) DEVICES, SYSTEMS, AND METHODS FOR ADJUSTING PROBING DISTANCES

(71) Applicant: QUALCOMM Incorporated, San Diego, CA (US)

(72) Inventors: Ning He, Solana Beach, CA (US); Hongbo Yan, Vista, CA (US); Daniel Fred Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/840,099

(22) Filed: Mar. 15, 2013

(65) Prior Publication Data

US 2013/0308478 A1    Nov. 21, 2013

Related U.S. Application Data

(60) Provisional application No. 61/649,704, filed on May 21, 2012, provisional application No. 61/716,582, filed on Oct. 21, 2012, provisional application No. 61/734,276, filed on Dec. 6, 2012, provisional (Continued)

(51) Int. Cl.
*H04B 7/08* (2006.01)
*H04W 24/02* (2009.01)
(Continued)

(52) U.S. Cl.
CPC .. *H01Q 3/24* (2013.01); *H04B 1/44* (2013.01); *H04B 7/0404* (2013.01);
(Continued)

(58) Field of Classification Search
CPC .......... H01Q 3/24; H04B 1/44; H04B 7/0404; H04B 7/0608; H04B 7/0814; H04W 24/02; H04W 36/14; H04W 36/30; H04W 72/085; H04W 72/027; H04W 88/06
See application file for complete search history.

(56) References Cited

U.S. PATENT DOCUMENTS 5,481,571 A    1/1996    Balachandran et al.
5,530,926 A    6/1996    Rozanski
(Continued)

FOREIGN PATENT DOCUMENTS

EP    746118 A1    12/1996
EP    1175021 A2    1/2002
(Continued)

OTHER PUBLICATIONS

International Search Report and Written Opinion—PCT/US2013/041888—ISA/EPO—Oct. 31, 2013.
(Continued)

*Primary Examiner* — Paul H Masur
(74) *Attorney, Agent, or Firm* — Larry J. Moskowitz

(57) ABSTRACT

A wireless communication apparatus includes a first antenna, a second antenna, a first receive circuit coupled to the first antenna and a second receive circuit coupled to the second antenna. The first receive circuit is configured to measure one or more downlink performance characteristics of the first antenna and the second receive circuit is configured to measure one or more downlink performance characteristics of the second antenna during at least part of a same time period. The wireless communication apparatus further includes a controller configured to determine a difference between the one or more downlink performance characteristics of the first antenna and the second antenna, and determine a next time to use the second receive circuit to measure the one or more downlink performance characteristics of the second antenna based on the determined difference between the one or more downlink performance characteristics of the first antenna and the second antenna.

32 Claims, 8 Drawing Sheets

Related U.S. Application Data application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.

| | | |
|---|---|---|
| *H01Q 3/24* | (2006.01) | |
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |

(52) U.S. Cl.
CPC ........... *H04B 7/0602* (2013.01); *H04B 7/0608* (2013.01); *H04B 7/0802* (2013.01); *H04B 7/0814* (2013.01); *H04W 24/02* (2013.01); *H04W 36/14* (2013.01); *H04W 36/30* (2013.01); *H04W 72/085* (2013.01); *H04W 76/027* (2013.01); *H04W 88/06* (2013.01)

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,594,475 | B1 | 7/2003 | Anvekar et al. |
| 6,947,716 | B2 | 9/2005 | Ono |
| 6,961,545 | B2 | 11/2005 | Tehrani et al. |
| 7,295,528 | B2 | 11/2007 | Ibrahim et al. |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 | 3/2009 | Dunn et al. |
| 7,502,592 | B2 | 3/2009 | Yamamoto et al. |
| 7,546,404 | B2 | 6/2009 | Yeh et al. |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,036,710 | B2 | 10/2011 | Walton et al. |
| 8,085,734 | B2 | 12/2011 | Faber |
| 8,144,821 | B2 | 3/2012 | Hutchison et al. |
| 8,159,399 | B2 | 4/2012 | Dorsey et al. |
| 8,213,344 | B2 | 7/2012 | Zhu et al. |
| 8,244,944 | B1 | 8/2012 | Wong et al. |
| 8,301,192 | B2 | 10/2012 | Kakitsu et al. |
| 8,417,205 | B2 | 4/2013 | Tang et al. |
| 8,463,214 | B2 | 6/2013 | Yen et al. |
| 8,600,427 | B2 | 12/2013 | Ibrahim et al. |
| 8,615,270 | B2 | 12/2013 | Ibrahim et al. |
| 8,755,359 | B2 | 6/2014 | Faber |
| 8,831,532 | B2 | 9/2014 | Nukala et al. |
| 2002/0086648 | A1 | 7/2002 | Wilhelmsson et al. |
| 2002/0118724 | A1 | 8/2002 | Kishimoto et al. |
| 2002/0126640 | A1 | 9/2002 | Komatsu |
| 2003/0157954 | A1 | 8/2003 | Medvedev et al. |
| 2004/0029619 | A1 | 2/2004 | Liang et al. |
| 2004/0229650 | A1 | 11/2004 | Fitton et al. |
| 2004/0242277 | A1 | 12/2004 | Kiribayashi |
| 2005/0059431 | A1 | 3/2005 | Matsui et al. |
| 2005/0101252 | A1 | 5/2005 | Carvalho et al. |
| 2005/0113039 | A1 | 5/2005 | Tsukamoto |
| 2005/0266903 | A1 | 12/2005 | Masaki |
| 2006/0025090 | A1 | 2/2006 | Shirakata et al. |
| 2006/0073829 | A1 | 4/2006 | Cho et al. |
| 2006/0133544 | A1 | 6/2006 | Kawada et al. |
| 2006/0276132 | A1 | 12/2006 | Sheng-Fuh et al. |
| 2007/0032255 | A1 | 2/2007 | Koo et al. |
| 2007/0066244 | A1 | 3/2007 | Kao et al. |
| 2007/0066361 | A1 | 3/2007 | Knudsen et al. |
| 2007/0093282 | A1 | 4/2007 | Chang et al. |
| 2007/0178839 | A1 | 8/2007 | Rezvani et al. |
| 2007/0238496 | A1 | 10/2007 | Chung et al. |
| 2008/0043671 | A1 | 2/2008 | Moon et al. |
| 2008/0102760 | A1 | 5/2008 | McConnell et al. |
| 2008/0123610 | A1 | 5/2008 | Desai et al. |
| 2008/0240280 | A1 | 10/2008 | Li |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1 | 5/2009 | Sherman et al. |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0231473 | A1* | 9/2010 | Shtrom et al. ................. 343/757 |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0250926 | A1 | 10/2011 | Wietfeldt et al. |
| 2011/0292786 | A1 | 12/2011 | Haessler et al. |
| 2011/0311001 | A1 | 12/2011 | Lindenbauer et al. |
| 2012/0008510 | A1 | 1/2012 | Cai et al. |
| 2012/0027112 | A1 | 2/2012 | Jiang et al. |
| 2012/0115553 | A1 | 5/2012 | Mahe et al. |
| 2012/0142291 | A1 | 6/2012 | Rath et al. |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1 | 11/2012 | Mujtaba et al. |
| 2012/0320803 | A1 | 12/2012 | Skarp |
| 2012/0328057 | A1 | 12/2012 | Kroeger et al. |
| 2013/0005278 | A1 | 1/2013 | Black et al. |
| 2013/0017797 | A1 | 1/2013 | Ramasamy et al. |
| 2013/0023265 | A1 | 1/2013 | Swaminathan et al. |
| 2013/0033996 | A1 | 2/2013 | Song et al. |
| 2013/0035051 | A1 | 2/2013 | Mujtaba et al. |
| 2013/0040671 | A1 | 2/2013 | Zawaideh et al. |
| 2013/0084807 | A1 | 4/2013 | Nukala et al. |
| 2013/0156080 | A1 | 6/2013 | Cheng et al. |
| 2013/0217450 | A1 | 8/2013 | Kanj et al. |
| 2013/0267181 | A1 | 10/2013 | Ayatollahi et al. |
| 2013/0307727 | A1 | 11/2013 | He et al. |
| 2013/0308476 | A1 | 11/2013 | He et al. |
| 2013/0308477 | A1 | 11/2013 | He et al. |
| 2013/0308554 | A1 | 11/2013 | Ngai et al. |
| 2013/0308561 | A1 | 11/2013 | He et al. |
| 2013/0308562 | A1 | 11/2013 | Matin et al. |
| 2013/0308608 | A1 | 11/2013 | Hu et al. |
| 2013/0309981 | A1 | 11/2013 | Ngai et al. |
| 2013/0309982 | A1 | 11/2013 | Yan et al. |
| 2013/0310045 | A1 | 11/2013 | Yan et al. |
| 2013/0310109 | A1 | 11/2013 | Filipovic et al. |
| 2014/0105204 | A1 | 4/2014 | Bengtsson |

FOREIGN PATENT DOCUMENTS

| | | |
|---|---|---|
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |

(56) References Cited

FOREIGN PATENT DOCUMENTS

| WO | WO-0159945 A1 | 8/2001 |
| WO | WO-0241517 A2 | 5/2002 |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | WO-2011084717 A1 | 7/2011 |
| WO | 2012011077 A1 | 1/2012 |

OTHER PUBLICATIONS

Chapter II Demand & Response Under PCT Article 34—The International Preliminary Examining Authority; Feb. 28, 2014; (PCT/US2013/041883).

Heath R W et al., "Multimode Antenna Selection for Spatial Multiplexing Systems With Linear Receivers", IEEE Transactions on Signal Processing, IEEE Service Cetner, New York, NY, US, vol. 53, No. 8, Aug. 1, 2005, pp. 3042-3056, XP011136488, ISSN: 1053-587X, DOI: DOI:10.1109/TSP.2005.851109.

* cited by examiner

DEVICES, SYSTEMS, AND METHODS FOR ADJUSTING PROBING DISTANCES

CROSS REFERENCE TO RELATED APPLICATIONS

The present application for patent claims priority to and the benefit of U.S. Provisional Application Nos. (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically to adjusting probing distances in a wireless communication apparatus.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may support communications using multiple radio access technologies. Different radio access technologies may be used to expand the scope of services offered by the communications as a mobile device moves through different regions supporting different radio access technologies. Furthermore, different radio access technologies may be used to allow a user to engage in a variety of different forms of wireless communication activities.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One embodiment of the subject matter described in the disclosure provides a wireless communication apparatus. The wireless communication apparatus includes a plurality of antennas including a first antenna and a second antenna. The wireless communication apparatus further includes a plurality of receive circuits including a first receive circuit coupled to the first antenna and a second receive circuit coupled to the second antenna, wherein the first receive circuit is configured to measure one or more downlink performance characteristics of the first antenna and the second receive circuit is configured to measure one or more downlink performance characteristics of the second antenna during at least part of a same time period. The wireless communication apparatus further includes a controller configured to determine a difference between the one or more downlink performance characteristics of the first antenna and the second antenna, and determine a next time to use the second receive circuit to measure the one or more downlink performance characteristics of the second antenna based on the determined difference between the one or more downlink performance characteristics of the first antenna and the second antenna.

Another aspect of the subject matter described in the disclosure provides an implementation of a method implemented in a wireless communication apparatus. The method includes monitoring one or more downlink performance characteristics of a first antenna coupled to a first receive circuit and monitoring one or more downlink performance characteristics of a second antenna coupled to a second receive circuit during at least part of a same time period that the one or more downlink performance characteristics of a first antenna are monitored. The method further includes determining a difference between the one or more downlink performance characteristics of the first antenna and the one or more downlink performance characteristics of the second antenna, and determining a next time to use the second receive circuit to measure the one or more downlink performance characteristics of the second antenna based on the determined difference between the one or more downlink performance characteristics of the first antenna and the second antenna.

Yet another aspect of the subject matter described in the disclosure provides a wireless communication apparatus. The wireless communication apparatus includes means for monitoring one or more downlink performance characteristics of a first antenna coupled to a first receive circuit and means for monitoring one or more downlink performance characteristics of a second antenna coupled to a second receive circuit during at least part of a same time period that the one or more downlink performance characteristics of a first antenna are monitored. The wireless communication apparatus further includes means for determining a difference between the one or more downlink performance characteristics of the first antenna and the one or more downlink performance characteristics of the second antenna, and means for determining a next time to use the second receive circuit to measure the one or more downlink performance characteristics of the second antenna based on the determined difference between the one or more downlink performance characteristics of the first antenna and the second antenna.

Another aspect of the subject matter described in the disclosure provides a computer program product. The computer program product includes a computer readable medium. The computer readable medium includes code, when executed by a computer, causes the computer to code, when executed by a computer, causing the computer to monitor one or more downlink performance characteristics of a first antenna coupled to a first receive circuit. The computer readable medium further includes code, when executed by a computer, causing the computer to monitor one or more downlink performance characteristics of a second antenna coupled to a second receive circuit during at least part of a same time period that the one or more downlink performance characteristics of a first antenna are monitored. The computer readable medium further includes code, when executed by a computer, causing the computer to determine a difference between the one or more downlink performance characteristics of the first antenna and the one or more downlink performance characteristics of the second antenna. The computer readable medium further includes code, when executed by a computer, causing the computer to determine a next time to use the second receive circuit to measure the one or more downlink performance characteristics of the second antenna based on the determined difference between the one or more downlink performance characteristics of the first antenna and the second antenna.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
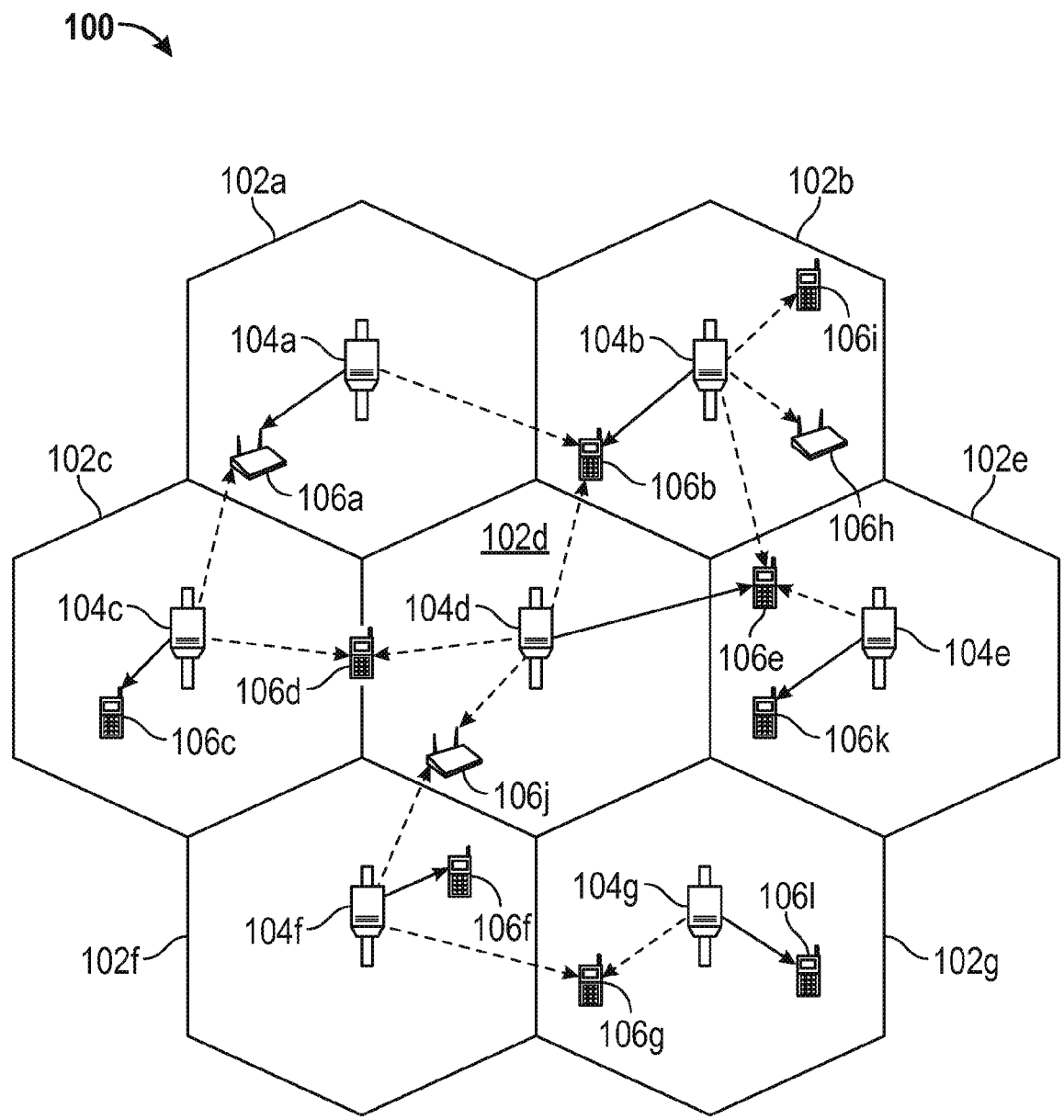
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects or embodiments set forth herein. In addition, such an apparatus may be implemented and/or such a method may be practiced using other structure and/or functionality in addition to or other than one or more of the aspects or embodiments set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and the like. The terms "networks" and "systems" are often used interchangeably. A CDMA network may implement a radio technology such as Universal Terrestrial Radio Access (UTRA), cdma2000, and the like. UTRA includes Wideband-CDMA (W-CDMA) and Low Chip Rate (LCR). A cdma2000 network may include IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). The cdma2000 and EV-DO standards are described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA may be useful especially for use in uplink communications where lower PAPR greatly benefits the mobile terminal in terms of transmit power efficiency. For example, SC-FDMA has been adopted as an option for the uplink multiple access method in LTE networks.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations, access points, and the like), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, each of the ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device or apparatus (e.g., a mobile phone, router, personal computer, server, etc.) used by a user to send and receive voice or data communications over a communications network. An AT 106 may also be referred to herein as user equipment (UE), mobile station (MS), or a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs). For example, AT 106 may be capable of operating using one or more RATs defined by standards such as wideband code division multiple access (WCDMA), cdma2000 1×, 1×-EV-DO, LTE, eHRPD, 802.11, and the like. An AT 106 may perform a plurality of tasks across various communication systems using these different RATs. The communication may be accomplished using a plurality of collocated transmitters and/or receivers, or may be communicated using one single transmitter and/or receiver.

Figure 2:
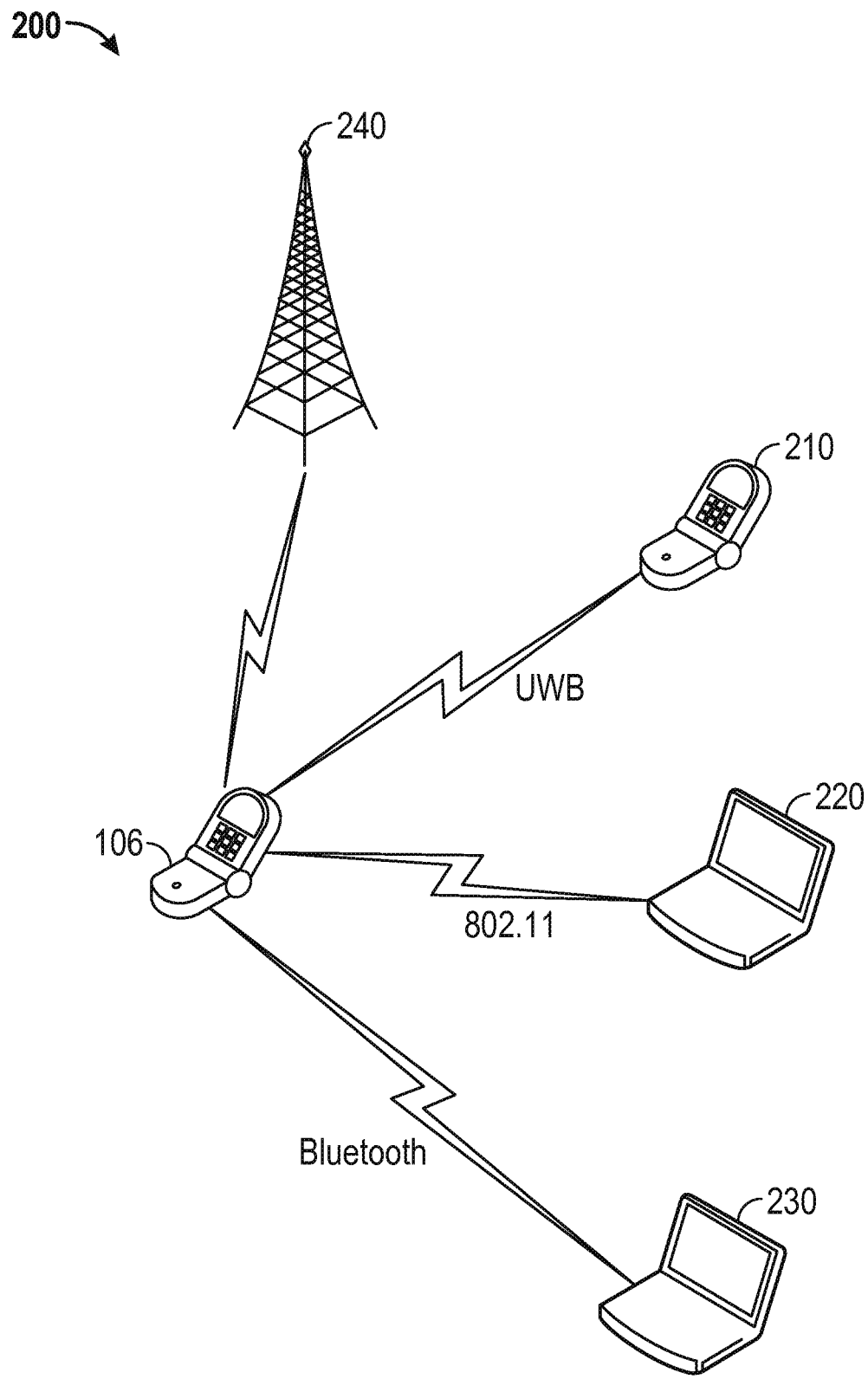
FIG. 2 shows an example of a functional block diagram of an exemplary mobile device operating in a wireless communication network in accordance with some embodiments.

FIG. 2 shows an example of a functional block diagram of an exemplary access terminal (AT) 106 operating in a wireless communication network 200 in accordance with some embodiments. The wireless communication network 200 comprises the AT 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. The AT 106 may be simultaneously in communication with each of devices 210, 220, 230, and 240 via one or more transmitters and/or receivers collocated on access terminal 106.

With continuing reference to FIG. 2, the AT 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n, etc.), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, such as a home, office, a group of buildings, or the like. A WLAN may use standards, such as an 802.11 standard and/or other standards, for wireless communications. In some embodiments, a WLAN may use peer-to-peer communication in which the wireless communication devices directly communicate with each other.

The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices directly communicate with each other.

The wireless communications network 200 may also comprise a wide wireless area network (WWAN). The WWAN may use standards such as WCDMA, cdma2000 1×, 1×-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of access terminal 106, as described in greater detail below.

Although the following embodiments may refer to FIG. 1 or 2, one will recognize that they are readily applicable to other communication standards. For example, some embodiments may be applicable in a UMTS communication system. Some embodiments may be applicable in an OFDMA communication system. The communication system 200 may further comprise any type of communication system including, but not limited to, a WCDMA system, a GSM system, a CDMA system, and an OFDM system.

Figure 3:
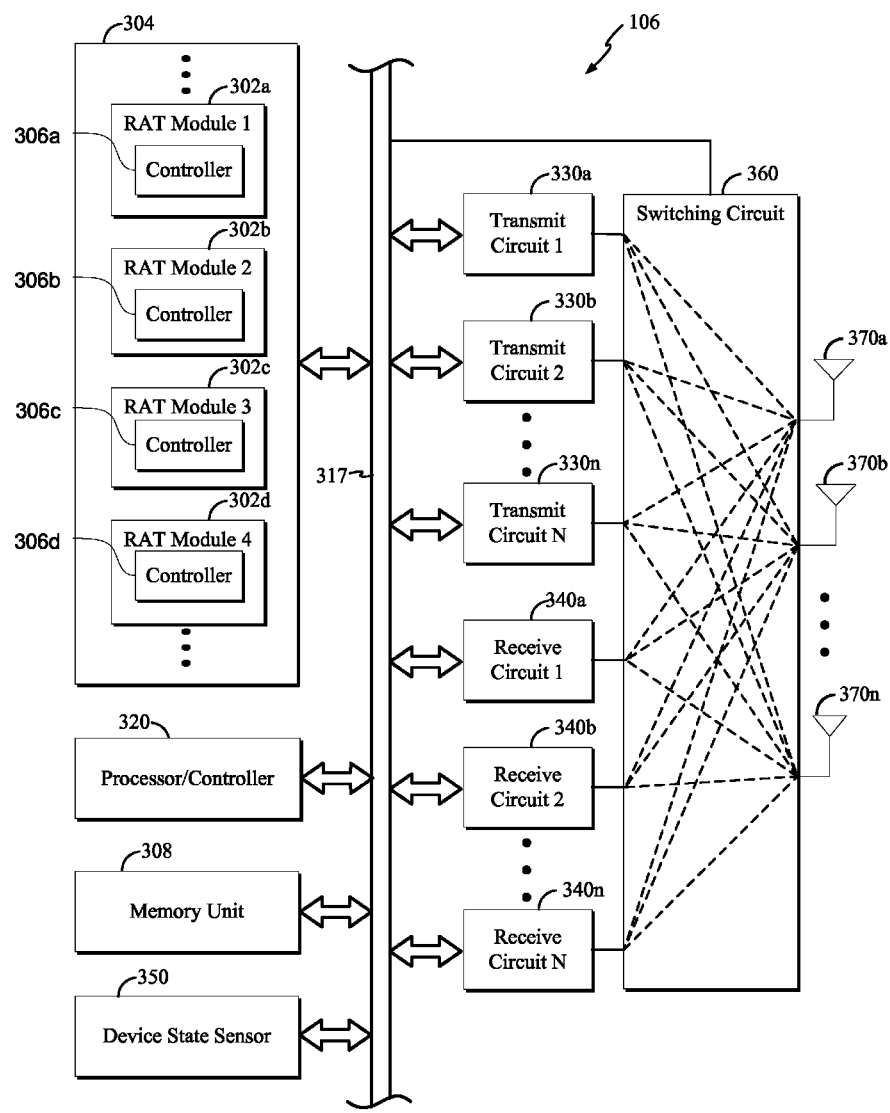
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a central data bus 317 linking several circuits together. The circuits include a controller/processor 320, a memory unit 308, and RAT circuitry 304, which may include various RAT modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors of the processor/controller 320 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different RATs. Each of the RAT modules 302a, 302b, 302c, and 302d may implement a specific RAT and may each individually include additional memory modules, communication components, and functions which are applicable to the RAT type implemented by the module. Each RAT module 302a, 302b, 302c, and 302d may include baseband circuitry specific to each radio access technology. Each RAT module 302a, 302b, 302c, and 302d may further include a controller 306a, 306b, 306c, and 306d, each of which may be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore, RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module may include its own transceiver(s), including one or more antennas (not shown). The RAT modules may implement any of the RAT types discussed above with reference to FIGS. 1-2, or any other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications signals via antennas 370a, 370b, and/or 370n. For example, transmit circuit 330a may include a modulator (not shown), a digital-to-analog (D/A) converter (not shown), an amplifier (not shown), as well as other circuitry for modulating and preparing wireless communications signals for transmission via antennas 370a, 370b, and/or 370n. In some embodiments, one of the antennas 370a, 370b, and 370n may function as a primary antenna. In some cases, the RAT circuitry 304 may include transmit circuits 330a, 330b, and 330n where each RAT module 302a, 302b, 302c, and 302d may include one of the transmit circuits 330a, 330b, and 330n. As such, transmit circuits 330a, 330b, and 330n may be configured to transmit according to one or more radio access technologies associated with one of RAT modules 302a, 302b, 302c, and 302d. In some embodiments, one of the transmit circuits 330a, 330b, and 330n may function as a primary transmit circuit. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement wireless communications using OFDM, while a second RAT module 302b may implement a wireless communications using CDMA (e.g., WCDMA, cdma2000, and the like). As such, one transmit circuit 330a may include components configured for OFDM communications while a second transmit circuit 330b may include components configured CDMA communications (e.g., WCDMA, cdma2000, and the like).

The access terminal 106 further comprises one or more receive circuits 340a, 340b, and 340n. Receive circuits 340a, 340b, and 340n may also be referred to as receive chains having one or more components configured to receive wireless communications signals via antennas 370a, 370b, and/or 370n. For example, receive circuit 340a may include an amplifier (not shown), an analog-to-digital converter (not shown), a demodulator (not shown), as well as other circuitry for receiving and demodulating wireless communications signals received via antennas 370a, 370b, and/or 370n. In some cases, the RAT circuitry 304 may include receive circuits 340a, 340b, and 340n where each RAT module 302a, 302b, 302c, and 302d may include one or more of the receive circuits 340a, 340b, and 340n. As such, each of receive circuits 340a, 340b, and 340n may be configured to receive according to a radio access technology associated with one of the RAT modules 302a, 302b, 302c, and 302d. In some embodiments, one of the receive circuits 340a, 340b, and 340n may function as a primary receive circuit. In some cases, the access terminal 106 may have one receive circuit 340a. In other cases, one or more of the receive circuits 340a, 340b, and 340n may be activated or deactivated.

Transmit circuits 330a, 330b, and 330n may process and convert base-band signals to high-frequency (HF) signals for transmission. Receive circuits 340a, 340b, and 340n in turn may process and buffer received signals before sending the signals to the data bus 317. Transmit circuits 330a, 330b, and 330n may process and buffer the data from the data bus 317 before transmitting the signals from the access terminal 106. The processor/controller 320 controls the proper timing of the various components of the access terminal 106.

Each of transmit circuits 330a, 330b, and 330n and receive circuits 340a, 340b, and 340n may be configured to respectively transmit and receive via one or more of the antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice communications via antenna 370a while another transmit circuit 330b may be used for transmitting non-voice data via antenna 370b. Stated another way, a first transmit circuit 330a may be used for transmitting and receiving voice communications (e.g., WCDMA, cdma2000, and the like) via antenna 370a while a second transmit circuit 330b may be used for data only communications (e.g., data only (DO) LTE) via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal or lateral) ends or corners of the access terminal 106 or adjacent to each other. Generally, antennas 370a, 370b, and 370n can be located at similar or distinct places as desired or in accordance with device design.

In some embodiments, a switching circuit 360 may be provided to allow a processor/controller 320 to select the antennas 370a, 370b, and 370n for which transmit circuits 330a, 330b, and 330n or receive circuits 340a, 340b, and 340n are configured to transmit and receive. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The processor/controller 320 may be configured to switch transmit circuits 330a, 330b, and 330n and receive circuits 340a, 340b, and 340n to respectively transmit and receive via any combination of antennas 370a, 370b, and 370n. In some embodiments, the transmit circuits 330a, 330b, and 330n, and receive circuits 340a, 340b, and 340n may be included within RAT modules 302a, 302b, 302c, and 302d. As such, in some embodiments, the switching circuit 360 may be configured to switch each RAT module 302a, 302b, 302c, and 302d to respectively transmit and receive via any combination of antennas 370a, 370b, and 370n. In some embodiments, a RAT module 302a may determine an appropriate antenna and may direct the switching via the switching circuit 360. In other embodiments, the processor/controller 320 may direct the switching. In other embodiments, the RAT module 302a in combination with the processor/controller 320 may direct the switching.

In some embodiments, a selecting circuit and/or program may be provided to select one or more of the transmit circuits 330a, 330b, and 330n and/or the receive circuits 340a, 340b, and 340n with better downlink and/or uplink characteristics without switching. For example, the selecting circuit and/or program may shut down all antennas except the antenna that is selected for transmission and/or reception using a particular transmit and/or receive circuit.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as some switching functions, are software routines, modules, and/or data sets. The memory unit 308 can be tied to another memory circuit (not shown), which may be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors may be placed next to the antennas 370a, 370b, and 370n. Each of the multiple proximity sensors is configured to detect whether an object is in proximity to (e.g., blocking) a respective antenna 370a, 370b, and 370n. The device state sensor 350 may further include and/or be configured as an orientation sensor that may be configured to detect the orientation of the access terminal 106 with respect to the user of the access terminal 106. For example, the orientation sensor may include any suitable sensor, such as an accelerometer, a gyroscope, or the like. The device state sensor 350 may further include and/or be configured as other types of sensors for detecting a temporary condition or state of the access terminal 106. While shown as one functional block, multiple device state sensors of different types may be included. For example, the access terminal 106 may include both a separate proximity sensor and a separate orientation sensor.

In this specification and the appended claims, it should be clear that the terms "circuit," "circuitry," and the like are construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Access terminal 106 performance may be negatively affected by diminishing performance characteristics of the antennas 370a, 370b, 370n, due to, for example, blockage, fading, path loss, and/or design differences of the antennas 370a, 370b, 370n. For example, due to a hand or body blocking an antenna, device performance may be severely impacted. In some scenarios, the impact may lead to dropped calls or paging failures (e.g., missing pages when the access terminal 106 is in an idle state). Also, blocking may in some instances cause higher transmit power, which may lead to increased interference to the communication network and high power consumption. When the performance characteristics of one or more antennas are impacted to a certain extent, the access terminal 106 may fail to receive incoming calls and/or may fail to maintain a proper connection with the network. Switching from a first antenna that has diminished performance to a second antenna may avoid significant signal degradation for both uplink and downlink communications and may be conducted in a manner to improve signal reception/transmission performance.

Figure 4:
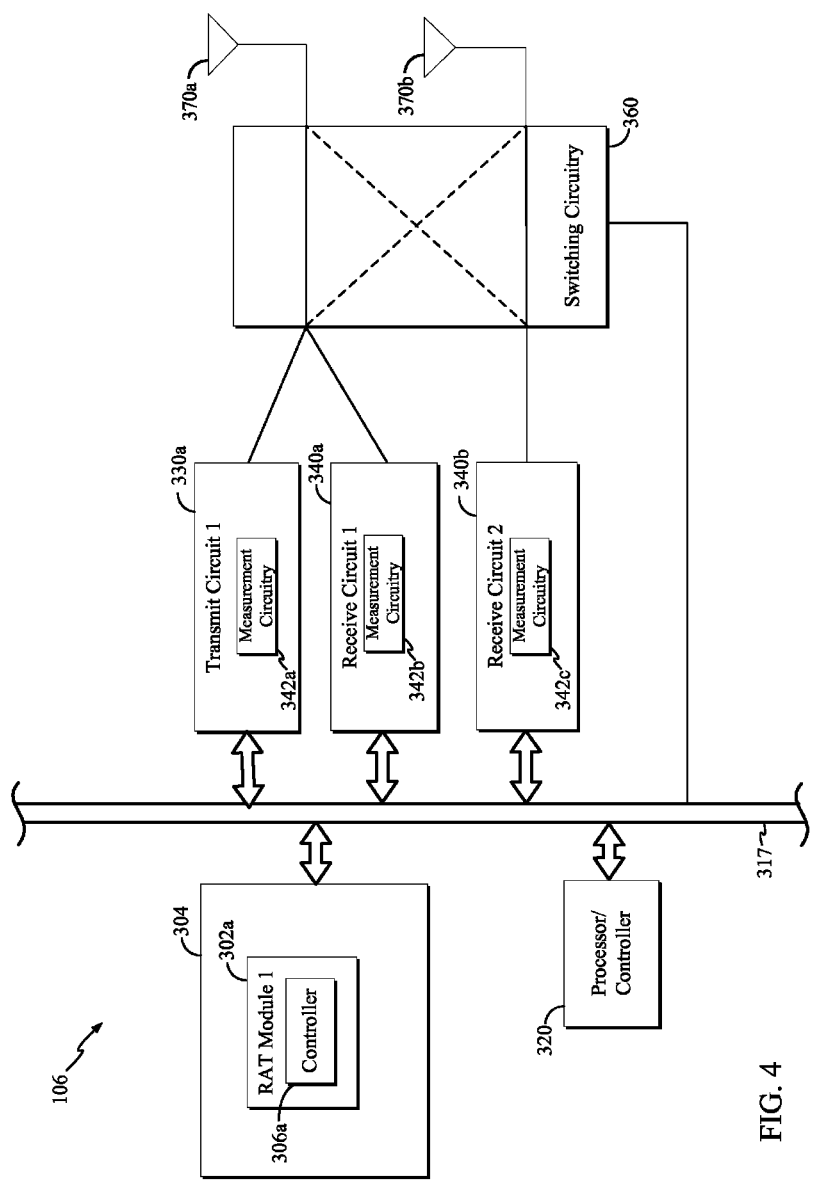
FIG. 4 is a functional block diagram of an embodiment of the access terminal shown in FIG. 3 in accordance with some embodiments.

FIG. 4 is a functional block diagram of an embodiment of the access terminal 106 shown in FIG. 3 in accordance with some embodiments. In some cases, the access terminal 106 may include two antennas 370a and 370b. The access terminal may further include a transmit circuit 330a, two receive circuits 340a and 340b, switching circuitry 360, a processor/controller 320, and RAT circuitry 304. The receive circuit 340a may be associated with the transmit circuit 330a in that the receive circuit 340a is configured to communicate via the same antenna 370a or 370b as that used by the transmit circuit 330a. As such, the processor/controller 320, the RAT Module 302a, or a combination thereof may be configured to switch the transmit circuit 330a and receive circuit 340a to respectively transmit and receive via the same antenna 370a or the antenna 370b. Stated another way, the first receive circuit 340a may be configured to be switched alongside the transmit circuit 330a. The RAT module 302a may include baseband circuitry specific to each radio access technology for which transmit circuit 330a, receive circuit 340a, and receive circuit 340b are configured to communicate.

In some embodiments, receive circuit 340a may be referred to as a primary receive circuit 340a, and receive circuit 340b may be referred to as a secondary receive circuit 340b. As illustrated in FIG. 4, the switching circuitry 360 is configured in a bar position, thus connecting transmit circuit 330a and receive circuit 340a to the antenna 370a. The antenna that is connected to the transmit circuit 330a and the primary receive circuit 340a may be referred to as a primary antenna, and the antenna that is connected to the secondary receive circuit 340b may be referred to as a secondary antenna. For example, if the switching circuitry 360 is in the bar position, as illustrated in FIG. 4, the antenna 370a is the primary antenna because it is connected to the transmit circuit 330a and the primary receive circuit 340a, and the antenna 370b is the secondary antenna due to its connection to secondary receive circuit 340b. As another example, if the switching circuitry 360 is in a crossbar position (indicated by the diagonal dotted lines in FIG. 4), the antenna 370b would be the primary antenna because it is connected to the transmit circuit 330a and the primary receive circuit 340a, and the antenna 370a would be the secondary antenna due to its connection to secondary receive circuit 340b.

The processor/controller 320, the RAT Module 302a, or a combination thereof may be configured to selectively switch the transmit circuit 330a and receive circuit 340a to communicate via either the antenna 370a or the antenna 370b. In addition, the receive circuit 340b may be configured to communicate via either of the antennas 370a or 370b that is not being used for the transmit circuit 330a and the receive circuit 340a. Accordingly, the processor/controller 320 and/or the RAT Module 302a may be configured to switch the transmit circuit 330a and the receive circuit 340a to communicate via the antenna that has better performance characteristics.

The transmit circuit 330a, the receive circuit 340a, and the receive circuit 340b may include measurement circuitry 342a, 342b, and 342c, respectively, configured to measure performance characteristic metrics. Performance characteristic metrics may include receive and transmit power levels (e.g., automatic gain control (AGC) measurements, received signal strength indicator (RSSI), received signal code power (RSCP), etc.), signal to interference plus noise ratio (SINR), signal to noise ratio (SNR), and the like. As one example, the measurement circuitry 342b and 342c may be configured to gather receive AGC measurements. As another example, the measurement circuitry 342a may be configured to gather transmit AGC measurements.

As described above, various factors affecting antenna performance may include certain operating conditions that result in one or more of the antennas 370a and 370b of FIG. 4 being de-sensed or otherwise resulting in one or more performance characteristics of the antennas 370a and/or 370b being reduced. For example, blockage, fading, path loss, and/or design differences of the antennas 370a and 370b may negatively affect antenna performance. Blockage may occur, for example, due to the hand of a user being wrapped around the access terminal 106, effectively blocking one or more of the antennas 370a and 370b. As another example, the access terminal 106 may be positioned such that antennas 370a and/or 370b may operate with less than ideal receive and/or transmit conditions. These scenarios may reduce power levels of received signals, thus making it more difficult to receive and demodulate signals. These scenarios may also make it difficult to effectively transmit signals. For example, blocking one or more of antennas 370a and 370b may reduce the total signal strength such that the transmit circuit 330a may need to increase power levels. However, with respect to increased transmit power levels, an access terminal 106 may be subject to regulatory radio frequency (RF) safety requirements and may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|_{rms}^2 \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of allowed transmit power levels. As such, when one or more of the antennas 370a and 370b are blocked, the maximum transmit power level allowed may be significantly reduced in order to avoid exceeding SAR limits.

As operation of the access terminal 106 may affect performance of the antennas 370a and/or 370b, dynamic switching systems and methods may be provided to configure the switching circuitry 360 for connecting transmit circuit 330a/receive circuit 340a and receive circuit 340b to antennas 370a and/or 370b. For example, in some embodiments, antenna switching may be accomplished by measuring the performance characteristics of antennas 370a and 370b (e.g., signal strength of signals transmitted and received via the antennas, power level, SINR, SNR, and the like) using the measurement circuitry 342a, 342b, and/or 342c. The performance characteristics of antennas 370a and 370b may be compared by the processor/controller 320, the RAT Module 302a, the transmit circuits 330a, the receive circuits 340a, 340b, or a combination thereof. If the performance characteristics of antenna 370b are better than the performance characteristics of antenna 370a, the transmit circuit 330a and receive circuit 340a may be switched to antenna 370b. As a result of the antenna switching, improved performance of the access terminal 106 may be achieved. For example, the switching of the transmit and receive circuits may mitigate antenna blockage and may allow for selecting antennas in such a way to meet regulatory limits at the least cost to performance and/or to enable good transmit and receive conditions. Furthermore, in one aspect, transmit antenna selection may allow the mitigation of interference and may provide a target quality of service using the least amount of transmit power.

The performance characteristics switching techniques described above may require the access terminal 106 to periodically turn on a second receive circuit 340b connected to antenna 370b in order to measure and compare the performance characteristics of the antenna 370b with that of a currently used first antenna 370a connected to receive circuit 340a. As described above, the comparison may be used to determine whether to switch the first receive circuit 340a from antenna 370a to 370b. This process of turning on the second receive circuit 340b to measure the performance characteristics of the antenna 340b for comparison with those of antenna 340a may be referred to as probing, with each instance of turning on the receive circuit 340b and measuring the performance characteristics of its antenna 370b being referred to as a probe. The distances in time between these probes may be referred to as a probing distance. A probe may cause extra power consumption in the access terminal 106 due to the periodic turning on of the second circuit 340b and its antenna 370b. Probing distances that are longer than necessary may result in slow switching response times, while probing distances that are shorter than necessary may result in large power consumption. Accordingly, system and methods are described herein for dynamically adjusting one or more probing distances in order to reduce power consumption of the access terminal 106 and to optimize response times for switching antennas. The dynamically adjusting of the probing distances may be carried out using a dynamic probing technique or algorithm, discussed in further detail below. The dynamic probing techniques or algorithms may include dynamically adjusting the probing distances based on differences in the performance characteristics of the receive circuits 340a, 340b and their respective antennas 370a, 370b in order to reduce power consumption and optimize response times for switching.

Figure 5:
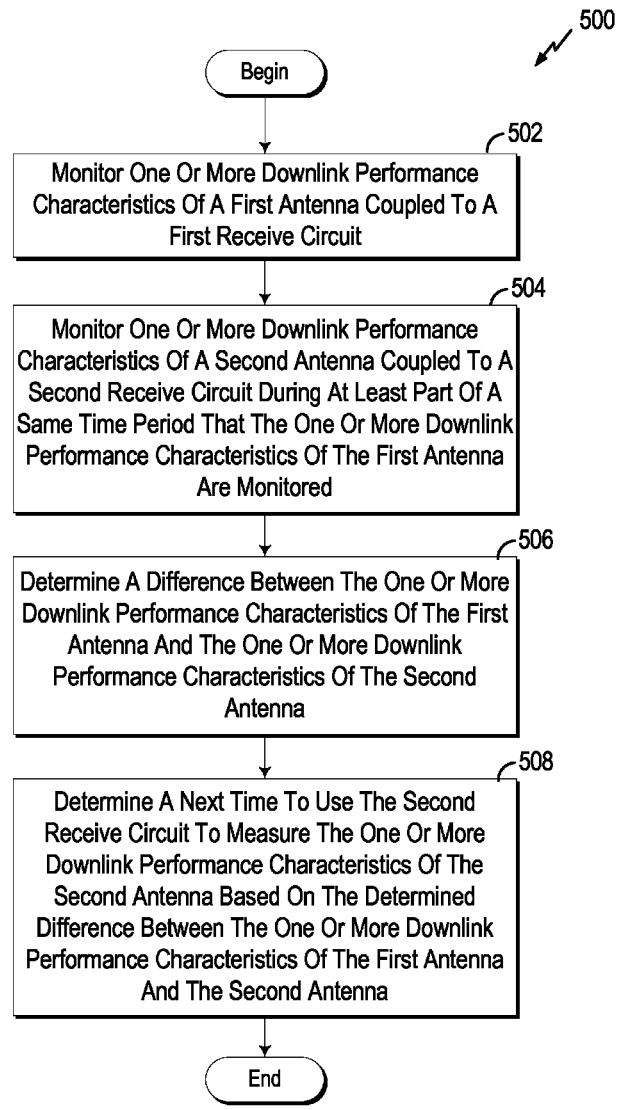
FIG. 5 is a flowchart of an implementation of an exemplary method implemented by a wireless communication apparatus in accordance with some embodiments in accordance with some embodiments.

FIG. 5 illustrates a flowchart of an implementation of an exemplary method 500 implemented by a wireless communication apparatus in accordance with some embodiments. The method 500 may be implemented at a wireless communication apparatus implemented as an access terminal 106, for example. Although the method 500 is described below with respect to elements of the access terminal 106, those having ordinary skill in the art will appreciate that other components may be used to implement one or more of the blocks described herein.

At block 502, the method 500 begins by monitoring one or more downlink performance characteristics of a first antenna coupled to a first receive circuit. In one embodiment, the first receive circuit may include receive circuit 340a and the first antenna may include antenna 370a, as illustrated in FIG. 4. At block 504, the method 500 continues by monitoring one or more downlink performance characteristics of a second antenna coupled to a second receive circuit during at least part of a same time period that the one or more downlink performance characteristics of the first antenna are monitored. The monitoring of the downlink performance characteristics of the first and second antennas may occur at the same time or may overlap at least for a period of time. For example, the first receive circuit may monitor the performance characteristics of the first antenna while the second receive circuit monitors the performance characteristics of the second antenna. The monitoring of the one or more downlink performance characteristics of the second antenna may occur during a probe, during which the second receive circuit is powered on to monitor the second antenna. In one embodiment, the second receive circuit may include receive circuit 340b and the second antenna may include antenna 370b, as illustrated in FIG. 4. In some embodiments, two or more transmit circuits are included in the access terminal 106 illustrated in FIG. 4, and the uplink performance characteristics of the antennas 370a and 370b may be monitored.

At block 506, a difference is determined between the one or more downlink performance characteristics of the first antenna and the one or more downlink performance characteristics of the second antenna. In one embodiment, the receive circuit 340a, the receive circuit 340b, the processor/controller 320, the RAT Module 302a, or a combination thereof may determine the difference between the downlink performance characteristics of the antennas. For example, the amount of the difference may indicate whether a switch of the first receive circuit 340a from the first antenna 370a to the second antenna 370b is likely to occur after a future probe. For example, larger differences between the performance characteristics of the first receive circuit 340a and the second receive circuit 340b indicates a higher imbalance level between the two receive circuits, which may indicate a higher possibility of switching the first receive circuit 340a to the second antenna 370b.

At block 508, the method 500 continues by determining a next time to use the second receive circuit to measure the one or more downlink performance characteristics of the second antenna based on the determined difference between the one or more downlink performance characteristics of the first antenna and the second antenna. Accordingly, the probing distance may be adjusted based on the determined difference between the downlink performance characteristics of the first and second antennas.

In some embodiments, the next time to use the second receive circuit is fixed if the second receive circuit is, before determining the next time, already in use by the wireless communication apparatus for purposes other than measuring the one or more downlink performance metrics of the second antenna. For example, if the second receive circuit is already turned on and is being used for receiving communications (e.g., a page, control information, data, etc.), the next time to use the second receive circuit for measuring the performance characteristics of the second antenna may be fixed. Accordingly, the probing distances will not be dynamically adjusted using the dynamic probing techniques or algorithms.

In some embodiments, the method further comprises determining the next time to use the second receive circuit if the second receive circuit needs to be turned on before determining the next time. For example, the processor/controller 320, the RAT Module 302a, or a combination thereof may determine that the second receive circuit 330b is already turned on and being used by other services than the dynamic probing operations. Accordingly, in some embodiments, the dynamic probing techniques or algorithms may only be used when the second receive is not already turned on and being used by other services.

In some embodiments, the method further comprises selectively switching the first receive circuit from receiving wireless communications via the first antenna to receive wireless communications via the second antenna if the determined difference is above a first predetermined threshold. For example, if the determined difference in the current probe is above the first predetermined threshold, the first receive circuit (e.g., 340a) and a corresponding transmit circuit (e.g., 330a) may be switched to the second antenna. In some embodiments, if the difference between the performance characteristics in the current probe and in one or more previous probes, or their weighted average, is above the first predetermined threshold, the first receive circuit and the corresponding transmit circuit may be switched to the second antenna for receiving wireless communications. The first predetermined threshold may be determined based on a difference in performance characteristics between the first and second antenna that indicates a switch to the second antenna is necessary in order to maintain access terminal performance that is sufficient to perform the desired wireless communications.

In some embodiments, the method further comprises dynamically adjusting the next time to use the second receive circuit if the determined difference is not above the first predetermined threshold. Accordingly, the first receive circuit and the corresponding transmit circuit will not be switched to the second antenna, and the dynamic probing technique or algorithm will be used to dynamically adjust the next time to use the second receive circuit for monitoring the performance characteristics of the second antenna.

In some embodiments, the method 500 further comprises reducing an amount of time between turn on times of the second receive circuit if the determined difference is above a second predetermined threshold. For example, the second predetermined threshold may include a performance characteristic metric level indicating whether or not there is a large difference in performance characteristics between the first and second antenna. The second threshold may be determined based on a balance between power consumption and switching response time. For example, the second threshold may be determined in order to strike an optimal balance between conserving battery power and allowing the switching circuit 360 to timely and effectively switch the first receive circuit 340a from the first antenna to the second antenna as the performance of the first receive circuit 340a and the first antenna 370a degrades. In some embodiments, the first predetermined threshold is larger than the second predetermined threshold. Thus, the second threshold indicates that the difference is not large enough to switch antennas, but is large enough to adjust the probing distance. Accordingly, if the determined difference is above the second predetermined threshold, the access terminal 106 (e.g., the receive circuit 340a, the processor controller 320, the RAT Module 302a, or a combination thereof) may determine that the difference is high enough such that a switch to the second antenna is likely to occur after a future probe, and thus that it would be beneficial to shorten the probing distance for a faster switching response time. In some embodiments, the performance characteristic metrics may include a receive power level (e.g., automatic gain control (AGC) measurements, received signal strength indicator (RSSI), received signal code power (RSCP), etc.), an interference level (e.g., signal to interference plus noise ratio (SINR), etc.), signal to noise ratio (SNR), and the like.

In some embodiments, the method 500 further comprises increasing an amount of time between turn on times of the second receive circuit if the determined difference is below a second predetermined threshold. In some embodiments, the first predetermined threshold is larger than the second predetermined threshold. Accordingly, if the determined difference is below the second predetermined threshold described above, the access terminal 106 (e.g., the receive circuit 340a, the processor controller 320, the RAT Module 302a, or a combination thereof) may determine that the difference is low enough such that a switch to the second antenna is not likely to occur after a future probe, and thus that the probing distance should be lengthened in order to conserve battery power.

Figure 6:
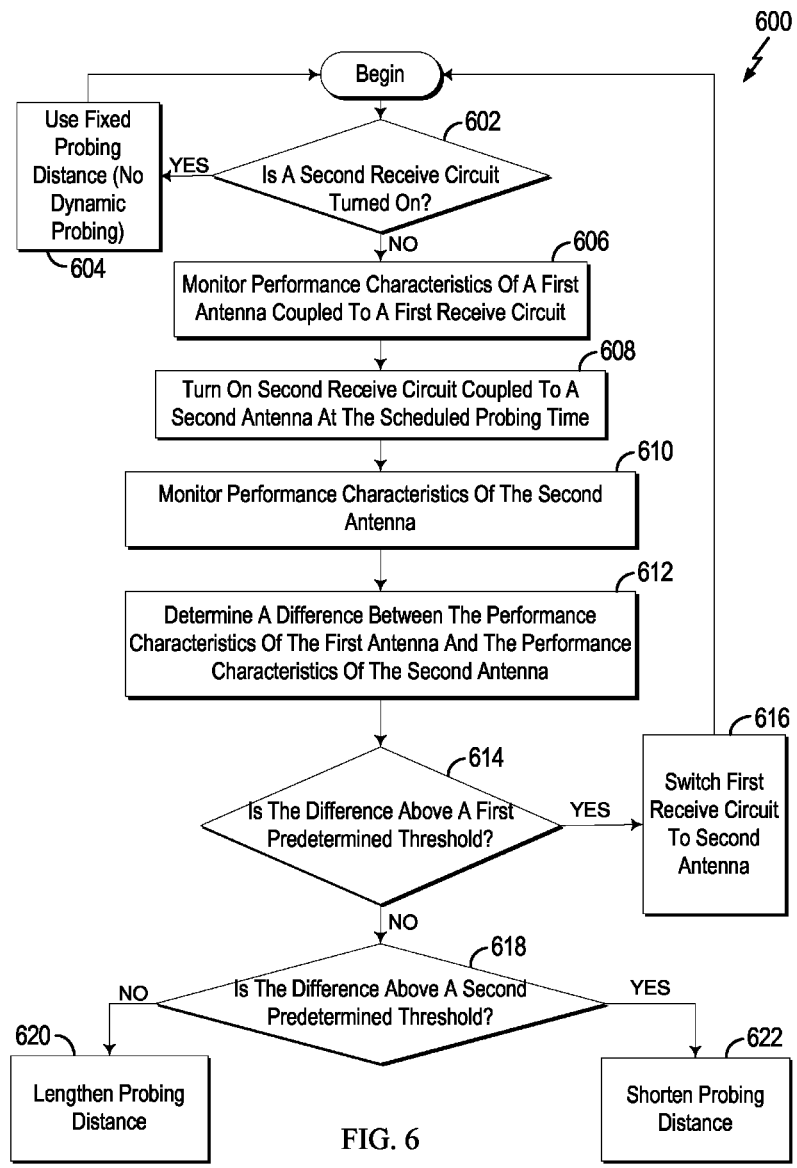
FIG. 6 is a flowchart of an implementation of another exemplary method implemented by a wireless communication apparatus in accordance with some embodiments in accordance with some embodiments.

FIG. 6 shows a flowchart of an implementation of an exemplary method 600 illustrating another embodiment of the method 500 as shown in FIG. 5. The method 600 may be implemented at a wireless communication apparatus implemented as an access terminal 106, for example, and may be used to implement the dynamic probing technique or algorithm. Although the method 600 is described below with respect to elements of the access terminal 106, those having ordinary skill in the art will appreciate that other components may be used to implement one or more of the blocks described herein.

At block 602, the method 600 begins by determining whether a second receive circuit is turned on. The second receive circuit may include receive circuit 340b, as illustrated in FIG. 4. For example, the processor/controller 320, the RAT Module 302a, or a combination thereof may determine whether the second receive circuit 340b is already turned on and is being used for receiving communications (e.g., a page, control information, data, etc.). At block 604, if the second receive circuit is already turned on, the method 600 continues by using a fixed probing distance and does not proceed with the dynamic probing technique or algorithm. Accordingly, the next time to turn on or use (if the second receive circuit is still turned on) the second receive circuit for measuring the performance characteristics of the second antenna may be fixed and the probing distances will not be dynamically adjusted using the dynamic probing technique or algorithm. After block 604, the method 600 begins again at the next probe by determining whether the second receive circuit is turned on at block 602.

At block 606, if the second receive circuit is not already turned on, the method 600 proceeds by monitoring one or more downlink performance characteristics of a first antenna coupled to a first receive circuit. For example, the first receive circuit may include receive circuit 340a and the first antenna may include antenna 370a, as illustrated in FIG. 4. In one embodiment, the receive circuit 340a, the processor/controller 320, the RAT Module 302a, or a combination thereof may monitor the performance characteristics of the first antenna 370a. In some embodiments, the performance characteristic metrics may include a receive power level (e.g., automatic gain control (AGC) measurements, received signal strength indicator (RSSI), received signal code power (RSCP), etc.), an interference level (e.g., signal to interference plus noise ratio (SINR), etc.), signal to noise ratio (SNR), and the like. At block 608, the method 600 turns on the second receiver circuit that is coupled to a second antenna at the scheduled probing time. In some embodiments, the second antenna is also turned on when the second receive circuit is turned on. The second antenna may include antenna 370b. For example, the access terminal 106 may perform a first probe at a scheduled probing time, and may turn on the second receive circuit 340b at the scheduled probing time in order to monitor and compare the performance characteristics of the second antenna 370b with those of the first antenna 370a.

At block 610, the method 600 continues by monitoring one or more downlink performance characteristics of the second antenna during the first probe. In one embodiment, the receive circuit 340b, the processor/controller 320, the RAT Module 302a, or a combination thereof may monitor the performance characteristics of the second antenna 370b. In some embodiments, the one or more downlink performance characteristics of a second antenna may be monitored during at least part of a same time period that the one or more downlink performance characteristics of the first antenna are monitored. The monitoring of the downlink performance characteristics of the first and second antennas may occur at the same time or may overlap at least for a period of time. For example, during the first probe, the first receive circuit 340a may monitor the performance characteristics of the first antenna 370a while the second receive circuit 340b monitors the performance characteristics of the second antenna 370b.

At block 612, a difference is determined between the one or more downlink performance characteristics of the first antenna and the one or more downlink performance characteristics of the second antenna. In one embodiment, the receive circuit 340a, the receive circuit 340b, the processor/controller 320, the RAT Module 302a, or a combination thereof may determine the difference between the downlink performance characteristics of the antennas 370a and 370b. The difference may be used by the access terminal 106 to determine whether the imbalance level between the antennas indicates that a switch of the first receive circuit 340a from the first antenna 370a to the second antenna 370b needs to occur during the current probe or that a switch to the second antenna is likely to occur after a future probe.

At block 614, the method 600 determines whether the determined difference is above a first predetermined threshold. In some embodiments, the method 600 may determine at block 614 whether a weighted average of a current and one or more previous probes is above the first predetermined threshold. For example, the method 600 may determine whether a weighted average of the difference between the performance characteristics in the current probe and in one or more previous probes is above the first predetermined threshold. The first predetermined threshold may be set to indicate that a large enough difference exists between the performance characteristics of the first receive antenna 370a and the second antenna 370b that a switch of the first receive circuit 340a to the second antenna 370b is necessary during the current probe to sustain sufficient performance of the access terminal 106. At block 616, if the difference between the performance characteristics of the first antenna 370a and the performance characteristics of the second antenna 370b are above the first predetermined threshold, the method 600 switches the first receive circuit 340a from the first antenna 370a to the second antenna 370b. For example, if the determined difference in the current probe is above the first predetermined threshold, the first receive circuit 340a and a corresponding transmit circuit 330a may be switched to the second antenna 370b. In some embodiments, if the difference between the performance characteristics in the current probe and in one or more previous probes, or the weighted average of the difference in the performance characteristics in the current and previous probes, is above the first predetermined threshold, the first receive circuit 340a and the corresponding transmit circuit 340b may be switched to the second antenna for receiving wireless communications. After switching the first receive circuit to the second antenna, the method 600 then continues to the beginning of the process at the next probe and determines whether the second receive circuit is turned on at block 602.

If the difference between the performance characteristics of the first antenna 370a and the performance characteristics of the second antenna 370b is not above the first predetermined threshold, the method 600 continues by performing the dynamic probing technique or algorithm. At block 618, the method 600 determines whether the determined difference is above a second predetermined threshold. For example, the second threshold level may be used to indicate whether there is a possibility that a switch of the first receive circuit 340a to the second antenna 370b is likely to be necessary after a future probe in order to sustain sufficient performance of the access terminal 106. The second predetermined threshold may include a performance characteristic metric level indicating whether the probing distance should be shortened or lengthened to strike a balance between power consumption and switching response time. For example, the second threshold may be determined in order to strike an optimal balance between conserving battery power and allowing the switching circuit 360 to timely and effectively switch the first receive circuit 340a from the first antenna 370a to the second antenna 370b as the performance of the first antenna 370a used by the first receive circuit 340a degrades. As one example, the second predetermined threshold may include a first performance characteristic metric level indicating whether or not there is a large enough imbalance in performance characteristics between the first and second antenna to justify shortening the probing distance so that the next probe occurs at a shorter duration than that of the first probe. Accordingly, the probing distance may be adjusted based on the second predetermined threshold as compared to the determined difference between the performance characteristics of the first antenna 370am, as used by the first receive circuit 340a, and the second antenna 370b, as used by the second receive circuit 340b.

At block 620, the method 600 continues by lengthening the probing distance if the determined difference between the performance characteristics of the first antenna 370a and the second antenna 370b is not above the second predetermined threshold. As a result, the amount of time between turn on times of the second receive circuit 340b is increased. Accordingly, due to the determined difference being below the second predetermined threshold, the receive circuit 340a, the processor controller 320, the RAT Module 302a, or a combination thereof may determine that the difference is low enough such that a switch of the first receive circuit 340a to the second antenna 370b is not likely to occur after a future probe, and thus that the probing distance should be lengthened in order to conserve battery power.

At block 622, the method 600 continues by shortening the probing distance if the determined difference between the performance characteristics of the first antenna 370a and the second antenna 370b is not above the second predetermined threshold. As such, the amount of time between turn on times of the second receive circuit 340b for measuring and comparing the performance characteristics of the second antenna 370a to the first antenna 370b is reduced if the determined difference is above the predetermined threshold and is not above the second predetermined threshold. Accordingly, if the determined difference is above the predetermined threshold, the receive circuit 340a, the processor controller 320, the RAT Module 302a, or a combination thereof may determine that the difference is high enough such that a switch of the first receive circuit 340a to the second antenna 370b is likely to occur after a future probe, and thus that it would be beneficial to shorten the probing distance for a faster switching response time.

In some embodiments, more than one predetermined threshold may be used to determine whether and how much to shorten or lengthen the probing distance. For example, the different lengths of the probing distances may be based on a comparison with a second (T2), third (T3), and fourth (T4) thresholds, where T2>T3>T4. The amount of change in the probing distance depends on the corresponding threshold level where the difference in performance characteristics falls. For example, if the determined difference between the performance characteristics of the first antenna 370*a* and the second antenna 370*b* is above T2, then the probing distance is shortened by a maximum amount (e.g., from 2.5 seconds to 0.5 seconds). As another example, if the determined difference is below T2, but above T3 (T2>probing distance>T3), the probing distance may be shortened by a second amount that is less than the first amount (e.g., from 2.5 seconds to 1 seconds). As another example, if the determined difference is below T2 and T3, but above T4 (T2>T3>probing distance>T4), the probing distance may be shortened by a third amount that is less than the first amount and the second amount (e.g., from 2.5 seconds to 1.5 seconds). As another example, if the determined difference is below T2, T3, and T4, the probing distance may be lengthened by a particular amount (e.g., from 2.5 seconds to 3.5 seconds). It will be apparent to one of skill in the art that the probing distance may be adjusted by any amount of time and based on more or less thresholds than that described herein in order to achieve an optimal balance between power consumption and switching response time. In some embodiments, a look-up table may be used by the dynamic probing technique or algorithm to identify the appropriate amount of adjustment to make to the probing distance based on a measured amount of difference between the performance characteristics of the first antenna 370*a* and the second antenna 370*b*. For example, the look-up table may include columns of probing distance adjustments that are correlated to rows of differences in performance characteristics.

As a result of the methods 500 and/or 600 including the dynamic adjustment of probing distances based on the comparison of receive and/or transmit circuit and the corresponding antenna performance characteristics, an optimal balance may be achieved between power consumption and antenna selection performance. It should be appreciated that the principles described above with reference to FIGS. 4-6 may be applied where the number of transmit and receive circuits, as well as antennas, is greater than or less than the number described herein.

Figure 7:
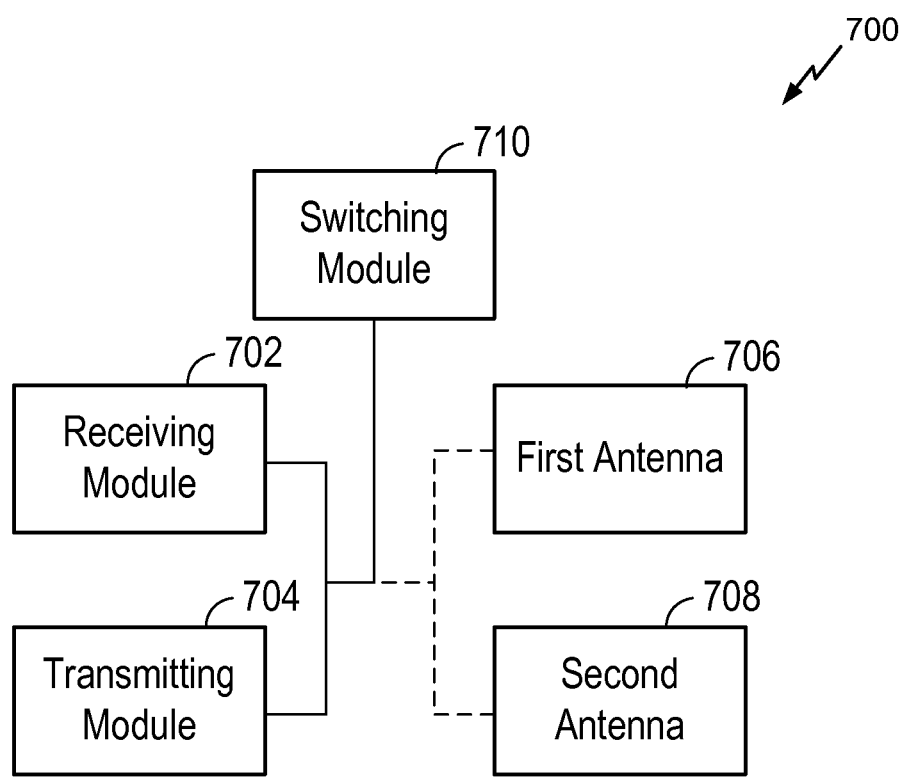
FIG. 7 is a functional block diagram of an exemplary wireless communication apparatus that may be employed within the wireless communication system in accordance with some embodiments.

FIG. 7 is a functional block diagram of an exemplary wireless communication apparatus 700 that may be employed within the wireless communication system 100 in accordance with some embodiments. Those skilled in the art will appreciate that a wireless communication device 700 may have more components, such as any one or more of the components shown in FIGS. 3 and/or 4. The wireless communication device 700 shown includes only those components useful for describing some prominent features of certain embodiments.

The device 700 includes a receiving module 702. In some cases, a means for receiving may include the receiving module 702. In some embodiments, the receiving module 702 may include a single receive circuit or a plurality of receive circuits including the first receive circuit. For example, the receive circuit or the plurality of receive circuits may include one or more of receive circuits 340*a*, 340*b*, and 340*n*. The receiving module 702 may be configured to perform, alone or in combination with other components of the device 700, one or more of the functions described above with respect to blocks 502-508 of FIG. 5 and/or blocks 602-622 of FIG. 6. For example, the receive module 702 may be configured to, at least, monitor the performance characteristics of the first and second antennas, determine a difference in the performance characteristics, and determine a next time to use the second receive circuit to measure the performance characteristics of the second antenna based on the difference.

The device 700 further includes a transmitting module 704. In some cases, a means for transmitting may include a transmitting module 704. In some embodiments, the transmitting module 704 may include a plurality of transmit circuits, such as transmit circuits 330*a*, 330*b*, and 330*n*. The device 700 further includes a first antenna 706 and a second antenna 708. For example, the first antenna 706 and the second antenna 708 may include antennas 370*a* and 370*b*, respectively.

The device 700 further includes a switching module 710. In some embodiments, switching module 710 may include the switching circuitry 360. The switching module 710 may be configured to perform one or more of the functions described above with respect to block 616 as illustrated in FIG. 6. In some cases, a means for switching and/or a means for selectively switching may include the switching module 710.

The device 700 may further include a processor/controller and/or an RAT Module. In some embodiments, a means for monitoring and/or a means for determining may include the process/controller and/or the RAT module, and may be configured to perform, alone or in combination with other components of the device 700, one or more of the functions described above with respect to blocks 502-508 of FIG. 5 and/or blocks 602-622 of FIG. 6. For example, the processor/controller and/or the RAT Module may be configured to determine whether the second receive circuit is turned on, monitor the performance characteristics of the first and second antennas, determine a difference between the one or more downlink performance characteristics of the first antenna and the one or more downlink performance characteristics of the second antenna, and determine a next time to use the second receive circuit to measure the one or more downlink performance characteristics of the second antenna based on the determined difference between the one or more downlink performance characteristics of the first antenna and the second antenna.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 8:
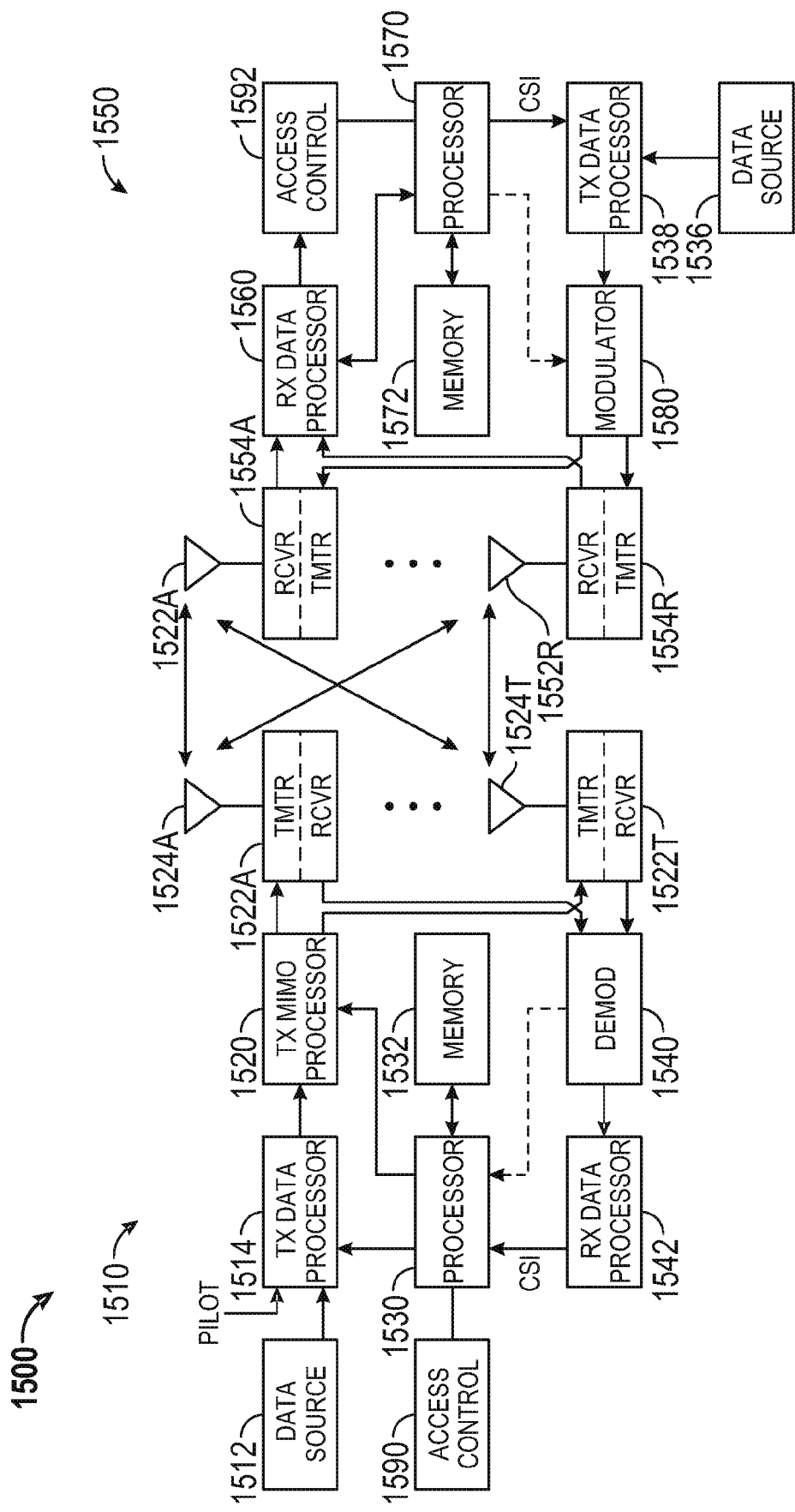
FIG. 8 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 8 depicts several sample components that may be employed to facilitate communication between nodes in accordance with some embodiments. Specifically, FIG. 8 is a simplified block diagram of a first wireless device 1510 (e.g., an access point) and a second wireless device 1550 (e.g., an access terminal) of a multiple-in-multiple-out (MIMO) system 1500. At the first device 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the second device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and down converts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the second device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the second device 1550 are received by the antennas 1524, conditioned by the transceivers 1522, demodulated by a demodulator (DEMOD) 1540, and processed by a RX data processor 1542 to extract the reverse link message transmitted by the second device 1550. The processor 1530 then determines which precoding matrix to use for determining the beam-forming weights then processes the extracted message.

FIG. 8 also illustrates that the communication components may include one or more components that perform access control operations as taught herein. For example, an access control component 1590 may cooperate with the processor 1530 and/or other components of the device 1510 to send/receive signals to/from another device (e.g., device 1550) as taught herein. Similarly, an access control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the access control component 1590 and the processor 1530 and a single processing component may provide the functionality of the access control component 1592 and the processor 1570. Furthermore, the components of the apparatus 1500 described with reference to FIG. 3 may be incorporated with/into the components of FIG. 8.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method implemented in a wireless communication apparatus, the method comprising:
    a plurality of antennas including a first antenna and a second antenna;
    a plurality of receive circuits including a first receive circuit coupled to the first antenna and a second receive circuit coupled to the second antenna, wherein the first receive circuit is configured to measure one or more downlink performance characteristics of the first antenna and the second receive circuit is configured to measure one or more downlink performance characteristics of the second antenna during at least part of a same time period; and
    a controller configured to:
        determine a difference between the one or more downlink performance characteristics of the first antenna and the second antenna;
        determine a next time to use the second receive circuit to measure the one or more downlink performance characteristics of the second antenna based on the determined difference between the one or more downlink performance characteristics of the first antenna and the second antenna;
        determine the next time to use the second receive circuit if the second receive circuit needs to be turned on before determining the next time; and
        selectively switch the first receive circuit from receiving wireless communications via the first antenna to receive wireless communications via the second antenna if the determined difference is above a first predetermined threshold.

2. The wireless communication apparatus of claim 1, wherein the next time to use the second receive circuit is fixed if the second receive circuit is, before determining the next time, already in use by the wireless communication apparatus for purposes other than measuring the one or more downlink performance metrics of the second antenna.

3. The wireless communication apparatus of claim 1, wherein the controller is configured to dynamically adjust the next time to use the second receive circuit if the determined difference is not above the first predetermined threshold.

4. The wireless communication apparatus of claim 3, wherein the controller is configured to reduce an amount of time between turn on times of the second receive circuit if the determined difference is above a second predetermined threshold.

5. The wireless communication apparatus of claim 4, wherein the first predetermined threshold is larger than the second predetermined threshold.

6. The wireless communication apparatus of claim 3, wherein the controller is configured to increase an amount of time between turn on times of the second receive circuit if the determined difference is below a second predetermined threshold.

7. The wireless communication apparatus of claim 6, wherein the first predetermined threshold is larger than the second predetermined threshold.

8. The wireless communication apparatus of claim 1, wherein the one or more downlink performance characteristics of the first antenna and the second antenna include at least one of a power level and an interference level.

9. A method implemented in a wireless communication apparatus, the method comprising:
   monitoring one or more downlink performance characteristics of a first antenna coupled to a first receive circuit;
   monitoring one or more downlink performance characteristics of a second antenna coupled to a second receive circuit during at least part of a same time period that the one or more downlink performance characteristics of the first antenna are monitored;
   determining a difference between the one or more downlink performance characteristics of the first antenna and the one or more downlink performance characteristics of the second antenna;
   determining a next time to use the second receive circuit to measure the one or more downlink performance characteristics of the second antenna based on the determined difference between the one or more downlink performance characteristics of the first antenna and the second antenna;
   determining the next time to use the second receive circuit if the second receive circuit needs to be turned on before determining the next time; and
   selectively switching the first receive circuit from receiving wireless communications via the first antenna to receive wireless communications via the second antenna if the determined difference is above a first predetermined threshold.

10. The method of claim 9, wherein the next time to use the second receive circuit is fixed if the second receive circuit is, before determining the next time, already in use by the wireless communication apparatus for purposes other than measuring the one or more downlink performance metrics of the second antenna.

11. The method of claim 9, further comprising dynamically adjusting the next time to use the second receive circuit if the determined difference is not above the first predetermined threshold.

12. The method of claim 11, further comprising reducing an amount of time between turn on times of the second receive circuit if the determined difference is above a second predetermined threshold.

13. The method of claim 12, wherein the first predetermined threshold is larger than the second predetermined threshold.

14. The method of claim 11, further comprising increasing an amount of time between turn on times of the second receive circuit if the determined difference is below a second predetermined threshold.

15. The method of claim 14, wherein the first predetermined threshold is larger than the second predetermined threshold.

16. The method of claim 9, wherein the one or more downlink performance characteristics of the first antenna and the second antenna include at least one of a power level and an interference level.

17. A wireless communication apparatus, comprising:
   means for monitoring one or more downlink performance characteristics of a first antenna coupled to a first receive circuit;
   means for monitoring one or more downlink performance characteristics of a second antenna coupled to a second receive circuit during at least part of a same time period that the one or more downlink performance characteristics of the first antenna are monitored;
   means for determining a difference between the one or more downlink performance characteristics of the first antenna and the one or more downlink performance characteristics of the second antenna;
   means for determining a next time to use the second receive circuit to measure the one or more downlink performance characteristics of the second antenna based on the determined difference between the one or more downlink performance characteristics of the first antenna and the second antenna;
   means for determining is configured to determine the next time to use the second receive circuit if the second receive circuit needs to be turned on before determining the next time; and
   means for selectively switching the first receive circuit from receiving wireless communications via the first antenna to receive wireless communications via the second antenna if the determined difference is above a first predetermined threshold.

18. The wireless communication apparatus of claim 17, wherein the next time to use the second receive circuit is fixed if the second receive circuit is, before determining the next time, already in use by the wireless communication apparatus for purposes other than measuring the one or more downlink performance metrics of the second antenna.

19. The wireless communication apparatus of claim 17, wherein the means for determining is configured to dynamically adjust the next time to use the second receive circuit if the determined difference is not above the first predetermined threshold.

20. The wireless communication apparatus of claim 19, further comprising means for reducing an amount of time between turn on times of the second receive circuit if the determined difference is above a second predetermined threshold.

21. The wireless communication apparatus of claim 20, wherein the first predetermined threshold is larger than the second predetermined threshold.

22. The wireless communication apparatus of claim 19, further comprising means for increasing an amount of time between turn on times of the second receive circuit if the determined difference is below a second predetermined threshold.

23. The wireless communication apparatus of claim 22, wherein the first predetermined threshold is larger than the second predetermined threshold.

24. The wireless communication apparatus of claim 17, wherein the one or more downlink performance characteristics of the first antenna and the second antenna include at least one of a power level and an interference level.

25. A computer program product, comprising:

a non-transitory computer-readable medium comprising:

code, when executed by a computer, causing the computer to monitor one or more downlink performance characteristics of a first antenna coupled to a first receive circuit; and code, when executed by a computer, causing the computer to monitor one or more downlink performance characteristics of a second antenna coupled to a second receive circuit during at least part of a same time period that the one or more downlink performance characteristics of the first antenna are monitored;

code, when executed by a computer, causing the computer to determine a difference between the one or more downlink performance characteristics of the first antenna and the one or more downlink performance characteristics of the second antenna;

code, when executed by a computer, causing the computer to determine a next time to use the second receive circuit to measure the one or more downlink performance characteristics of the second antenna based on the determined difference between the one or more downlink performance characteristics of the first antenna and the second antenna;

code, when executed by the computer, causing the computer to determine the next time to use the second receive circuit if the second receive circuit needs to be turned on before determining the next time; and code, when executed by the computer, causing the computer to selectively switch the first receive circuit from receiving wireless communications via the first antenna to receive wireless communications via the second antenna if the determined difference is above a first predetermined threshold.

26. The computer program product of claim 25, wherein the next time to use the second receive circuit is fixed if the second receive circuit is, before determining the next time, already in use by the wireless communication apparatus for purposes other than measuring the one or more downlink performance metrics of the second antenna.

27. The computer program product of claim 25, wherein the non-transitory computer-readable medium further comprises code, when executed by the computer, causing the computer to dynamically adjust the next time to use the second receive circuit if the determined difference is not above the first predetermined threshold.

28. The computer program product of claim 27, wherein the non-transitory computer-readable medium further comprises code, when executed by the computer, causing the computer to reduce an amount of time between turn on times of the second receive circuit if the determined difference is above a second predetermined threshold.

29. The computer program product of claim 28, wherein the first predetermined threshold is larger than the second predetermined threshold.

30. The computer program product of claim 27, wherein the non-transitory computer-readable medium further comprises code, when executed by the computer, causing increase an amount of time between turn on times of the second receive circuit if the determined difference is below a predetermined threshold.

31. The computer program product of claim 30, wherein the first predetermined threshold is larger than the second predetermined threshold.

32. The computer program product of claim 25, wherein the one or more downlink performance characteristics of the first antenna and the second antenna include at least one of a power level and an interference level.

\* \* \* \* \*